Feb. 27, 1923. 1,446,739.

W. ELMENTHALER.
PARING AND PITTING KNIFE.
FILED JULY 22, 1922.

Inventor
William Elmenthaler.
Per Arthur Halliwell
Attorney

Patented Feb. 27, 1923.

1,446,739

UNITED STATES PATENT OFFICE.

WILLIAM ELMENTHALER, OF CLEVELAND, OHIO.

PARING AND PITTING KNIFE.

Application filed July 22, 1922. Serial No. 576,863.

*To all whom it may concern:*

Be it known that I, WILLIAM ELMENTHALER, a citizen of the United States, residing in Cleveland, county of Cuyahoga and State of Ohio, have invented a new and useful Paring and Pitting Knife, of which the following is a specification.

My invention relates to knives adapted for operation on vegetables, fruits, and similar objects.

The object of my invention is an efficient and simple knife adapted to operate either as a paring knife, or as a pitting knife, or as both, or as a knife for other allied operations.

Figure 1:
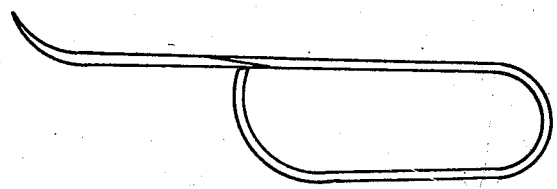
Figure 2:
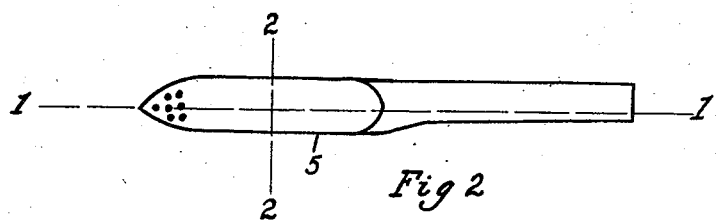
Figure 3:
Figure 4:
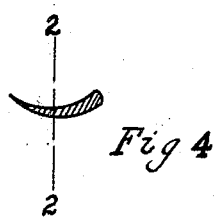

I attain this object by the mechanism illustrated in the accompanying drawing in which Fig. 1 is a general perspective view of a paring and pitting knife embodying the features of the present invention. Fig. 2 is a section, on a larger scale, on line 2—2 of Fig. 1; Fig. 3 is a section, on a larger scale, of the front end of the blade on line 3 of Fig. 1; Fig. 4 is a modification of a curved blade.

Similar reference characters refer to similar parts throughout the views.

The knife shown in the drawing is made of one piece of metal and has the blade portion 10 and the looped handle portion 11.

The blade portion 10 is curved transversely, as seen in Fig. 2, and longitudinally, as seen in Fig. 3, and has the cutting edge 12; both of these curvations merge and terminate in the point 13.

The knife, as a whole, may conveniently be formed of commercial bar stock and the blade portion is formed by forging or other convenient means.

Near the pointed end 13 of the blade portion and in the hollow thereof, are the teeth 14 which are similar to the teeth of a rasp file and may be produced on this blade portion in a manner similar to the production of teeth on a rasp file.

For some purposes, as pitting apples for instance, it may be more convenient to omit the point 13 and the longitudinal curvature on the blade portion and form this blade portion with the transverse curvature only as seen in Fig. 4. The blade portion shown here is provided with the cutting edge 15 and the teeth 16 which may, conveniently, be formed similar to the teeth 14.

This modification may also have the cutting edge 17 at the front end so that the blade may readily be inserted into and through the middle portion of an apple or other fruit. After the blade is so inserted, a rotative movement of the knife will cut out the pit without much loss of the meat of the fruit.

The loop of the handle portion is formed so that the three last fingers of a hand may be inserted therethrough while the index finger bears against the back of the blade portion as seen in Fig. 5 and the thumb is free to bear upon the fruit while the knife is in operation.

The knife provided with such a loop handle can be kept on the three fingers while operating on a quantity of fruit and leaves the end of these three fingers as well as the index finger and the thumb free for disposing of the fruit which has been operated upon and picking up a new fruit without removing the knife from the fingers, thereby saving considerable time.

A further advantage of this loop handle resides in the fact that the hand does not tire as easy as with the usual form of handle.

It is, of course, obvious that a handle of the usual form can be applied to the curved blade of the present invention if desired.

The spoon formed front end of the blade and the teeth therein serve the purpose of readily engaging the pit or seed stone of such fruits as cherries.

Although this knife can be used for many purposes; I will point out two purposes only.

For paring potatoes, the convex surface of the blade is disposed toward the potato and, by tilting the knife to different angles in relation to the potato, a thick or thin peel can be removed therefrom; either the point 13 or one corner of the front end of the knife shown in Fig. 4 serve the purpose of digging out the eyes or other depressions.

For removing the pit or seed stone of a cherry, insert the point of the knife into the cherry adjacent the pit and rest the thumb against the side of the cherry, then pull upward on the knife while holding the cherry downward with the thumb, whereupon the pit, gripped by the spoonlike end and the teeth therein, is easily removed from the cherry without loss of juice and without producing a large hole in the cherry.

Modifications may be made either in the blade, or in the handle, or in both, within the scope of the appended claims; therefore, without limiting myself to the precise construction shown and described.

I claim:

1. A paring and pitting knife comprising a spoon shaped blade on one end and provided with a pointed end to dig out eyes of vegetables and with a cutting edge on one side to pare vegetables and with teeth on the inside of this pointed end to grip stones when pitting fruit, and a handle on the other end of said knife.

2. A one piece paring and pitting knife comprising a spoon shaped blade portion provided with a pointed end to dig eyes out of vegetables and with a cutting edge on one side to pare vegetables and with teeth on the inside of this pointed end to grip stones when pitting fruit, a handle portion adjacent said blade portion, and a retainer portion looped over said handle portion.

In testimony whereof, I affix my signature in the presence of two witnesses.

WILLIAM ELMENTHALER.

Witnesses:
E. F. BROWN,
SWIFT M. LOWERY.